Aug. 17, 1926.
G. A. PATTBERG
1,596,855
APPARATUS FOR CONVERTING ROTARY MOTION INTO RECIPROCATING MOTION
Filed Oct. 17, 1925   2 Sheets-Sheet 1
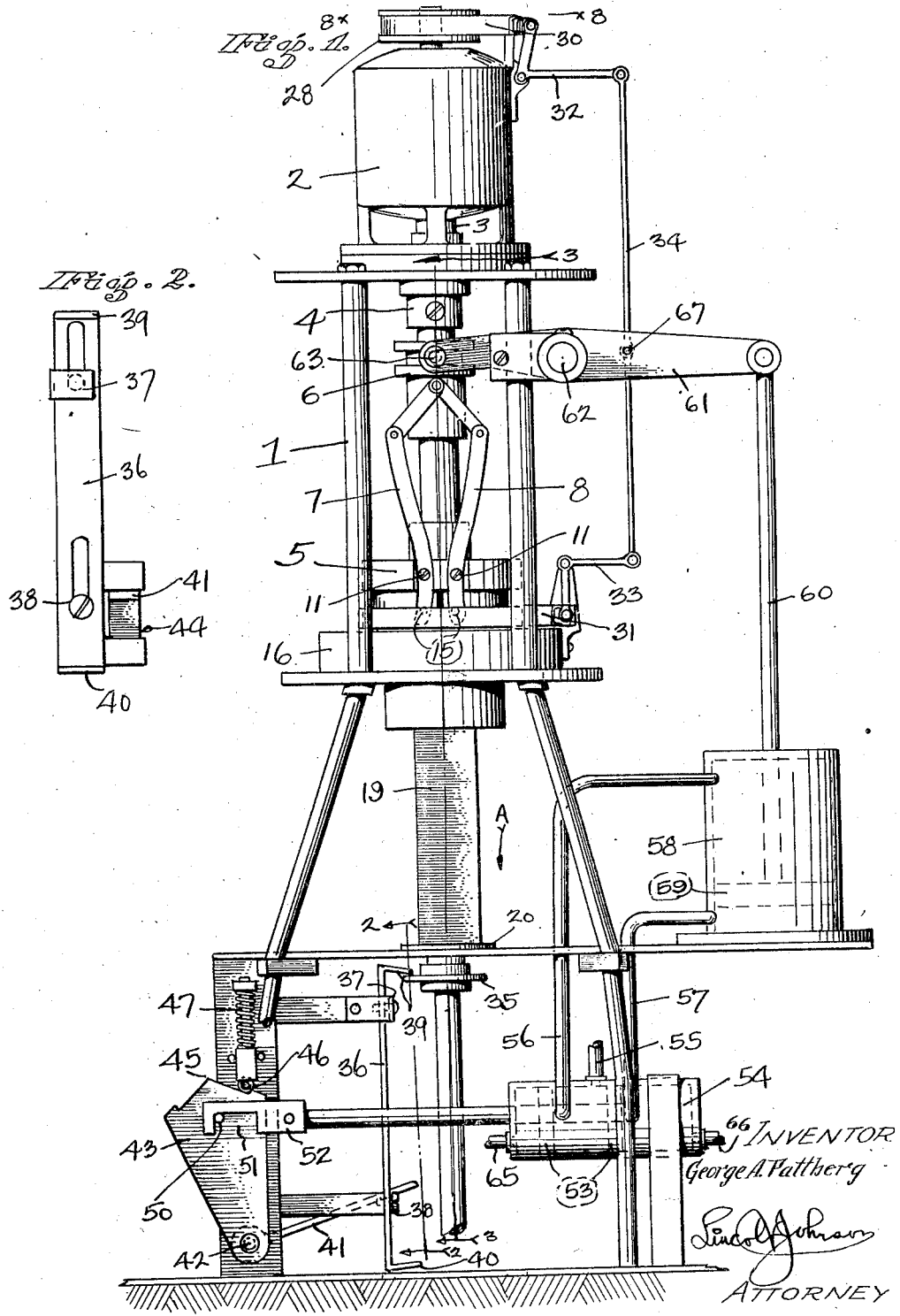

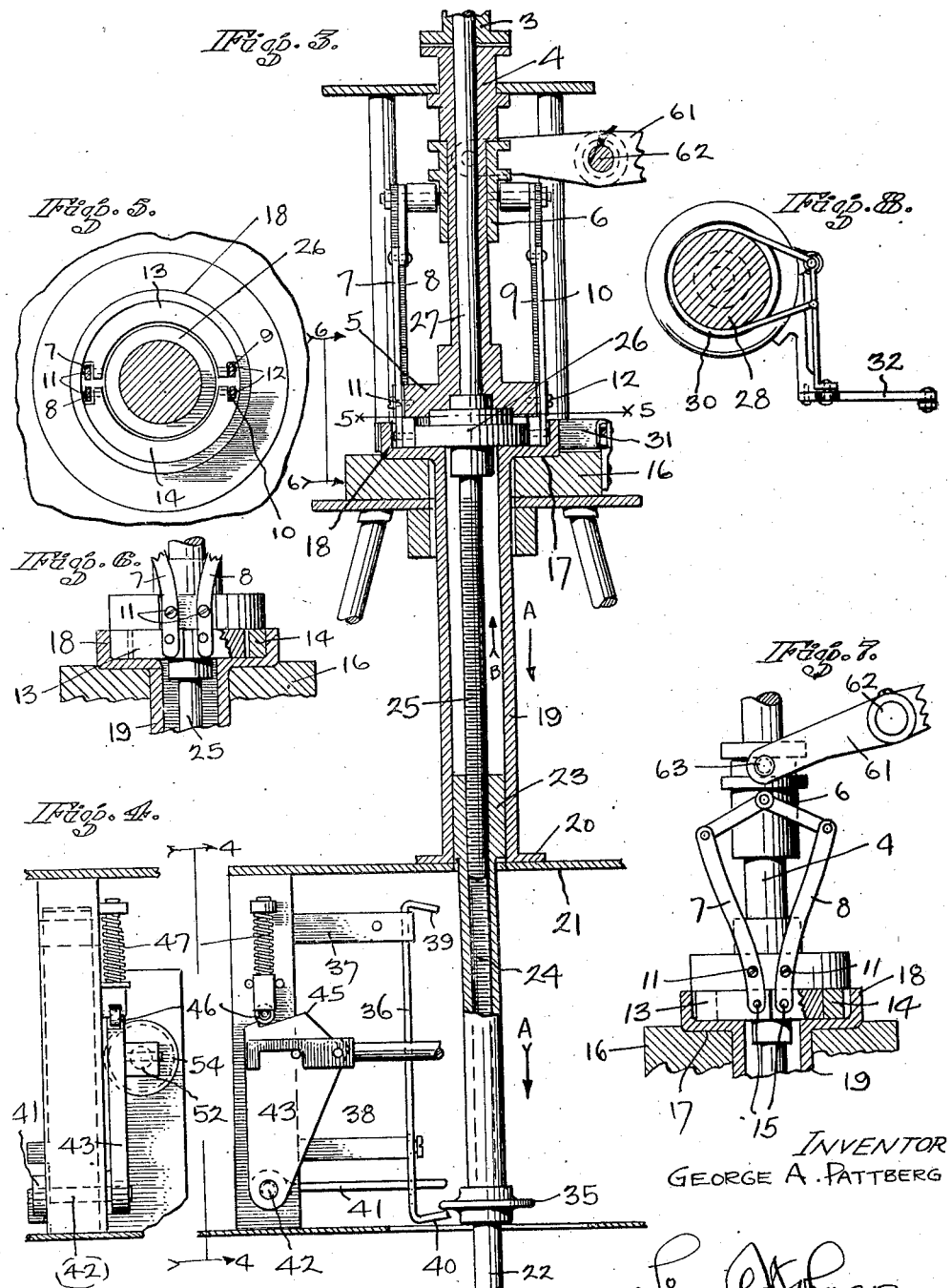

Patented Aug. 17, 1926.

1,596,855

UNITED STATES PATENT OFFICE.

GEORGE A. PATTBERG, OF SAN LEANDRO, CALIFORNIA, ASSIGNOR OF FIFTY PER CENT TO PEDER PEDERSEN, OF SAN LEANDRO, CALIFORNIA, AND GUS A. JOHNSON, OF ALAMEDA, CALIFORNIA.

APPARATUS FOR CONVERTING ROTARY MOTION INTO RECIPROCATING MOTION.

Application filed October 17, 1925. Serial No. 63,052.

This invention relates particularly to an improvement in pump heads for fluid pumps of the reciprocating type.

An object of the invention is to provide a pump head that is adapted to reciprocate a pump shaft vertically, the said pump shaft being in substantial axial alignment with the actuating medium.

A further object of the invention is to provide a pump head with a prime mover thereon, to rotate a pair of coacting hollow shafts that are adapted to reciprocate a pump shaft, means being interposed between the prime mover and the pair of hollow shafts, for automatically applying driving power to either one of the hollow shafts, and to automatically lock the non-driven hollow shaft from rotating.

A still further object of the invention is to provide a pump shaft that has one end thereof threaded internally and the exterior thereof squared, so as to be engaged respectively, by a threaded shaft and an internally squared shaft by which rotative movement of either the threaded shaft or the squared shaft causes the pump shaft to be rotated and moved axially relative thereto, the hollow shaft and squared shaft being rotated, alternately, by a clutch mounted on a driving medium.

Other objects of the invention relate to a pump head provided with a prime mover thereon; and with a single clutch on the said prime mover, by means of which either one of a pair of telescoping shafts may be rotated, to cause the reciprocation of the pump shaft; and a control apparatus, operated automatically by the reciprocating pump shaft, for actuating the driving clutch and controlling the application of power to the pump shaft and regulating its direction of movement; and to a pump head that is superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings,

Fig. 1 represents a diagrammatic side elevation of a pump head constructed in accordance with my invention.

Fig. 2 represents a section taken through Fig. 1 on the line 2—2.

Fig. 3 is a vertical section taken through Fig. 1 on the line 3—3.

Fig. 4 is a view taken through Fig. 3 on the line 4—4.

Fig. 5 is a section taken through Fig 3 on the line 5—5.

Fig. 6 is a fragmentary elevation partly broken away, taken on the line 6—6 of Fig. 3, showing the clutch expanded into contact with the square shaft.

Fig. 7 is a view similar to Fig. 6 showing the clutch contracted into contact with the threaded shaft.

Fig. 8 is a plan section taken through Fig. 1 on the line 8—8.

The majority of all fluid pumps of the reciprocating type are actuated by cranks or "walking-beams" which do not reciprocate the pump shaft on a true vertical line at all times. Pump heads that reciprocate the pump shafts on a line, more or less angularly inclined from the vertical, do not give the maximum efficiency that it is possible to obtain when the pump shaft is reciprocated on a true vertical line. My invention relates to an apparatus in which I convert the rotary motion of a prime mover into reciprocatory movement of the pump shaft and by so doing cause the pump shaft to be reciprocated in axial alignment with the prime mover.

In detail, the construction illustrated in the drawings comprises a frame 1, on the upper end of which an electrically driven motor 2, or other equivalent source of rotary power, is mounted. The armature 3 of the motor 2 is provided with a hollow shaft, for the purpose to be hereinafter described, and the armature 3 is connected with a hollow drive shaft 4 that is journaled at its opposite ends in the frame 1. The lower end of the hollow shaft 4 is provided with an enlarged, annular head 5 thereon, and the upper end of the shaft 4 is reduced in diameter to receive a shift collar 6 thereon. On diametrically opposite sides of the shift collar 6, I have pivoted a pair of compound link levers 7—8 and 9—10. The lower ends of the linked levers 7—8 and 9—10 are pivoted at 11—11 and 12—12, respectively, to the annular head 5 of the hollow shaft 4. The extreme lower ends of the linked levers 7—9 and 8—10 are pivoted, respectively, at 15 to the opposite ends of the split clutch rings, 13 and 14. The clutch rings 13 and 14 lie beneath the annular head 5 on the shaft 4, and are guided in their horizontal movement by the planar bottom face of the head 5.

A bearing block 16 is mounted on the frame 1 in close proximity to the lower end of the hollow shaft 4. The upper face of the bearing block 16 has an annular recess 17 therein, within which the circularly flanged end 18 of a squared tube 19 is rotatably mounted. The flanged end 18 of the tube 19 extends upwardly beyond the exterior face of each of the clutch rings 13 and 14, (see Figs. 3, 6 and 7), whereby the respective clutch rings 13 and 14 may be expanded, by the opposite pairs of linked levers 7—8 and 9—10, into frictional contact therewith (see Figs. 1 and 6) to effectuate coaction between the hollow shaft 4 and the square tube 19. Although I have indicated the tube 19 as being square in cross section, it is to be understood that any equivalent form of flat sided hollow tubing might be substituted in lieu thereof. The hollow end of the square tube 19 is flanged outwardly at the bottom at right angles, to provide a bearing surface 20 that is adapted to rest upon a planar plate 21 mounted on the main frame 1. The hollow tube 19 is rotatably mounted on the frame 1 in axial alignment with the driving motor 2 and the hollow shaft 4, that is the intermediary for transmitting the power from the prime mover through the clutch, to the flanged end of the square tube 19.

In order to obtain the greatest efficiency in the pumping operation, the axis of rotation of the driving motor 2 is arranged coaxially with that of the pump shaft 22. The pump shaft 22 is the work shaft that extends within the source of fluid supply, and is adapted to be reciprocated back and forth within the fluid supply to discharge the fluid from the supply.

The pump shaft 22 on its upper end is provided with a squared exterior 23 that is complementary to and is adapted to be moved axially within the interior of the square tube 19. The upper end of the pump shaft 22 is drilled and threaded, at 24, to receive a threaded shaft 25, journaled concentrically within the square tube 19. The threaded shaft 25 is provided with a circular collar 26 thereon that is journaled between the upper face of the flanged collar 18, on the square tube 19, and the lower face of the annular collar 5 provided on the hollow drive shaft 4. The shaft collar 26 is revolubly mounted within the split clutch rings 13 and 14 so that the said clutch rings may be clamped or contracted into engagement therewith, as shown in Figs. 3 and 7. The threaded shaft 25 is provided with a shaft end 27 thereon that extends upwardly through the hollow driving shaft 4 and through the hollow shaft of the armature and out beyond an end of the motor to permit the securing of a brake drum 28 thereon, for the purpose to be hereinafter described.

The prime mover 2 rotates in a clockwise direction, and when so rotating, the clutch rings 13 and 14 thereon are caused to be clamped onto the circular collar 26 of the shaft 25. The shaft 26 is thus rotated in a clockwise direction, and the threads thereon cause the pump shaft 24 to be raised upwardly thereon within the immovable square tube 19. As soon as the squared end 23 on the pump shaft 22 reaches the top of the up stroke, the clutches 13 and 14 are freed from their engagement with the threaded shaft 25 and expanded into engagement with the flanged end 18 of the squared tube 19, which causes the said tubing 19 to be rotated and to revolve the pump shaft 22 around and downwardly relative to the threaded shaft 25. The shaft 25 and tube 19 are adapted to coact with each other in rotating, to reciprocate the pump shaft 22 coaxially therewith and at all times during the operation of the pump head, either the tube 19 or shaft 25 are moving the pump shaft 22 up or down. In order to obtain the reciprocatory motion of the shaft 22, through the medium of the threaded shaft 25, it is necessary that a squared tube 19 or other equivalent flat faced element be utilized to coact with the threaded shaft 25 and with the pump shaft 22. The driving motor 2 always rotates in the same direction, and the combination of the threaded shaft 25 and square tube 19 utilizes the constant direction driving power of the motor to raise and lower the pump shaft. In the operation of my apparatus there is no necessity of reversing the direction of rotative movement of the prime mover, to accomplish the raising and lowering of the pump shaft. During such times as the driving clutch is engaged with the squared tube 19 as shown in Figs. 5 and 6, I have provided frictional means for locking the threaded shaft 25 from rotative movement. Similarly, when the threaded shaft 25 is being rotated by the clutch as shown in Fig. 7, it is desirable to lock the square tube 19 from rotating. A brake band 30 is fitted around the drum 28 on the shaft 27 to lock it against rotation and a brake band 31 is provided around the tube flange 18 to retard it from rotating. The brake band 30 is actuated by a bell crank 32 while the brake band 31 is actuated by a bell crank 33, and each of the cranks 32 and 33 are connected together by the bar 34, to insure that either one or the other of the brake bands will be operative when the other is inoperative, and vice versa. As will be hereinafter explained, the brake bands 30 and 31 are timed to work in unison with the expanding and contracting movement of the clutch.

In order that the reciprocating movement of the pump shaft 22 will be automatic, I have provided an annular collar 35 on the pump shaft that is adapted to actuate a directional controlling apparatus. Said apparatus is comprised of a tripper bar 36 slidably guided at 37 and 38 on the frame 1. The tripper bar 36 has its opposite ends flanged at 39 and 40 and said ends extend within the path of vertical movement of the annular shoulder 35 on the pump shaft 22. An arm 41 is pivoted at 42 to the frame 1, said pivot 42 having a double faced cam 43 fixedly mounted thereon. The arm 41 extends within a notch 44 provided on the tripper bar 36 whereby the vertical movement of the tripper bar 36 causes an arcuate movement of the cam arm 41. The cam 43 is provided with a central point 45 that is higher than either of the opposite ends. A roller 46 is urged by an expansion spring 47 into contact with the cam face of the cam 43, for the purpose of throwing the high point 45 of the cam 43 either to one side or the other, of an imaginary line drawn vertically through the axis of the spring urged roller 46 and the cam pivot 42. The roller 46 acts on the cam 43 to force it to one side or the other until the roller 46 abuts against the stops that are provided contiguous to the low points of the cam 43.

The initial swinging movement of the cam 43 is started by the vertical movement of the tripper bar 36 being raised or lowered by the pump shaft collar 35. The pump shaft collar 35 swings the cam 43 to a point where the high point 45 thereof moves past the spring urged roller 46, after which the remainder of movement of the cam 43 is actuated by the spring urged roller. A pin 50 is provided on the face of the cam 43 and is confined to arcuate in a horizontal direction in a slot 51 provided in a piston rod 52. The piston rod 52 is provided with spaced pistons 53 thereon that are reciprocable in a cylinder 54. The cylinder 54 is provided with a centrally located intake 55 to admit air, steam, water or other gaseous medium into the space between the pistons 53. The intake 55 is normally open to communicate with the space between the pistons. A pair of outlets 56 and 57 communicate through the cylinder 54 with the interior thereof. The outlets 56 and 57 connect with opposite ends of a cylinder 58 which has a plunger 59 therein. The plunger 59 is connected by the rod 60 to a beam 61 which is pivoted at 62 to the frame 1 and at its free end provided with pins 63 that are confined to movement in the shift collar 6. The reciprocating movement of the plunger 59 causes the shift collar 6 to be moved axially on the driven shaft 4 to actuate the linked levers 7—8 and 9—10 which in turn cause the clutch to be engaged with either the threaded shaft 25 or the tubular shaft 19. The plunger 59 is reciprocated by means of pressure that is passed into the cylinder 58 through either of the conduits 56 and 57 leading from the cylinder 54. The pressure is forced out of the cylinder 54 through whichever of the conduits 56 and 57 are open to communicate with the cylinder 58 according to the location of the pistons 53 within the cylinder 54. According to the position of the cam 43 as shown in Fig. 1, the piston rod 52 has been moved horizontally to place the pistons in the position shown, whereby the pressure is admitted through the pipe 56 into the cylinder 58 to force the plunger 59 downwardly. In the down position of the plunger 59, the clutch is expanded into contact with the flange ring 18 to cause the square tube 19 to be revolved and to rotate the pump shaft 22 therewith to force the same downwardly in the direction of the arrow "A". As the annular ring 35 on the pump shaft 22 is moved downwardly it comes into contact with the lower flanged end 40 of the tripper bar 36 and causes the cam 43 to be swung over into the position shown in Fig. 3. In the position shown in Fig. 3, the pistons 53 are moved to pass pressure from the cylinder 54 into the cylinder 58 to the under side of the plunger 59, causing the said plunger 59 to be elevated and to change the engagement of the clutch from the square tube 19 to clamping engagement with the threaded shaft 25. The waste pressure in the cylinder 58 on the inactive side of the plunger 59 is returned to an inactive end of the cylinder 54 where it is exhausted out through either one of the exhaust ports 65 or 66. Immediately after the clutch is changed over from engagement with the square tube 19 to the threaded shaft 25 the pump shaft 22 starts to move upwardly in the direction of the arrow "B", until the annular ring 35 on the pump shaft 22 engages the flanged end 39 on the tripper bar 36, which causes the cam 43 to be shifted over to the position shown in Fig. 1, and through the control mechanism to switch the clutch from engagement with the threaded shaft 25 into engagement with the square tube 19. This shifting operation is continued automatically just so long as the motor 2 is kept running. The rod 34 that controls the operation of the brake bands 30 and 31 is pivoted at 67 to the beam 61 so that either one of the brakes automatically engages the threaded shaft 25 or square tube 19, at a time when either one of said elements has the driving power applied thereto. The brake mechanism operates automatically and in conjunction with the clutch mechanism, whereby the strokes of the pump plunger may be made with a minimum of effort upon the operating parts of the pump head.

In the claims following, the invention has been limited particularly to its application of use on pump heads, and it is to be understood that such claims are intended to cover the said invention where it is used in other forms to transmit rotary motion into reciprocatory motion.

Having thus described this invention, what I now claim and desire to secure by Letters Patent is:

1. A pump head comprising a frame; a prime mover revolubly mounted on said frame; a pump shaft in axial alignment with said prime mover; means to connect the pump shaft and prime mover to move the pump shaft axially in one direction; and means to connect the pump shaft and prime mover to move the pump shaft axially in the opposite direction.

2. A pump head comprising a frame; a prime mover, having a vertically positioned driving shaft, mounted on said frame; a pump shaft to be reciprocated arranged coaxially with said driving shaft; a threaded shaft to connect the pump shaft and prime mover to move the pump shaft axially in one direction; and means to connect the pump shaft and driving shaft to move the pump shaft axially on the threaded shaft in the opposite direction.

3. A pump head comprising a frame; a prime mover revolubly mounted on said frame; a pump shaft in axial alignment with said prime mover; means to connect the pump shaft and prime mover to move the pump shaft axially in one direction; means to connect the pump shaft and prime mover to move the pump shaft axially in the opposite direction; and a mechanism operated by the pump shaft to automatically connect the prime mover to the pump shaft moving means.

4. A pump head comprising a frame; a prime mover, having a vertically positioned driving shaft, mounted on said frame; a pump shaft to be reciprocated arranged coaxially with said driving shaft; a threaded shaft to connect the pump shaft and prime mover to move the pump shaft axially in one direction; means to connect the pump shaft and driving shaft to move the pump shaft axially on the threaded shaft in the opposite direction; and a mechanism operated by the pump shaft to automatically connect the driving shaft to the pump shaft moving means.

5. A pump head comprising in combination a pump shaft; independent rotatable members coacting with each other to raise and lower the pump shaft axially; a prime mover to rotate either of the independent members; and a clutch on the prime mover to selectively engage either of the independent members to raise or lower the pump shaft.

6. A pump head comprising in combination a pump shaft; independent rotatable members coacting with each other to raise and lower the pump shaft axially; a prime mover to rotate either of the independent members; a clutch on the prime mover to selectively engage either of the independent members to raise or lower the pump shaft; and a brake to be applied to either of the independent members opposite the one engaged by the prime mover clutch.

7. A pump head comprising in combination a pump shaft; independent rotatable members coacting with each other to raise and lower the pump shaft axially; a prime mover to rotate either of the independent members; a clutch on the prime mover to selectively engage either of the independent members to raise or lower the pump shaft; and a mechanism actuated by the pump shaft to automatically shift the engagement of the prime mover clutch from one of the independent members to the other.

8. A pump head comprising in combination a pump shaft; independent rotatable members coacting with each other to raise and lower the pump shaft axially; a prime mover to rotate either of the independent members; a clutch on the prime mover to selectively engage either of the independent members to raise or lower the pump shaft; a mechanism actuated by the pump shaft to automatically shift the engagement of the prime mover clutch from one of the independent members to the other; and a mechanism actuated by the pump shaft to automatically stop rotation of the one of the independent members that is not engaged by the prime mover clutch.

9. A pump head comprising in combination a pump shaft; a pair of concentrically arranged rotatable shafts coacting with each other to raise and lower the pump shaft coaxially therewith; a prime mover to rotate either of the shafts; and a clutch on the prime mover to selectively engage either of the rotatable shafts to reciprocate the pump shaft.

10. A pump head comprising in combination a pump shaft; a pair of concentrically arranged rotatable shafts coacting with each other to raise and lower the pump shaft coaxially therewith; a prime mover to rotate either of the shafts; a clutch on the prime mover to selectively engage either of the rotatable shafts to reciprocate the pump shaft; and a mechanism actuated by the pump shaft to automatically shift the engagement of the clutch from one of the rotatable shafts to the other to reverse the direction of movement of the pump shaft.

11. A pump head comprising in combination a pump shaft; a pair of concentrically arranged rotatable shafts coacting with each other to raise and lower the pump shaft coaxially therewith; a prime mover to rotate either of the shafts; a clutch on the prime mover to selectively engage either of the rotatable shafts to reciprocate the pump shaft; a mechanism actuated by the pump shaft to automatically shift the engagement of the clutch from one of the rotatable shafts to the other to reverse the direction of movement of the pump shaft; and a mechanism actuated by the pump shaft to automatically apply friction to the one of the rotatable shafts not engaged by the clutch.

12. A pump head comprising in combination, a hollow pump shaft threaded internally and having a flat sided exterior; a frame; a flat sided hollow shaft journaled in said frame, coaxially with the pump shaft, and slidably engaging the exterior of the pump shaft; a threaded shaft journaled in the frame, concentrically with the flat sided hollow shaft, and engaging the internally threaded pump shaft; a driving shaft journaled in the frame coaxially with the threaded shaft; and a clutch on the driving shaft to selectively engage the flat sided hollow shaft and the threaded shaft to raise or lower the pump shaft axially relative thereto.

13. A pump head comprising in combination, a hollow pump shaft threaded internally and having a flat sided exterior; a frame; a flat sided hollow shaft journaled in said frame, coaxially with the pump shaft, and slidably engaging the exterior of the pump shaft; a threaded shaft journaled in the frame, concentrically with the flat sided hollow shaft, and engaging the internally threaded pump shaft; a driving shaft journaled in the frame coaxialy with the threaded shaft; a clutch on the driving shaft to selectively engage the flat sided hollow shaft and the threaded shaft to raise or lower the pump shaft axially relative thereto; and a mechanism actuated by the pump shaft to automatically shift the engagement of the clutch from the flat sided hollow shaft to the threaded shaft, and vice versa.

14. A pump head comprising in combination, a hollow pump shaft threaded internally and having a flat sided exterior; a frame; a flat sided hollow shaft journaled in said frame, coaxially with the pump shaft, and slidably engaging the exterior of the pump shaft; a threaded shaft journaled in the frame, concentrically with the flat sided hollow shaft, and engaging the internally threaded pump shaft; a driving shaft journaled in the frame coaxially with the threaded shaft; a clutch on the driving shaft to selectively engage the flat sided hollow shaft and the threaded shaft to raise or lower the pump shaft axially relative thereto; a mechanism actuate by the pump shaft to automatically shift the engagement of the clutch from the flat sided hollow shaft to the threaded shaft, and vice versa; and a mechanism actuated by the pump shaft to automatically apply friction to either the flatsided hollow shaft or the threaded shaft according to whichever of the last mentioned shafts is engaged by the clutch.

In testimony whereof, I have hereunto set my hand at San Francisco, California, this 14th day of October, 1925.

GEORGE A. PATTBERG.